United States Patent
Yamada

(10) Patent No.: US 9,174,623 B2
(45) Date of Patent: Nov. 3, 2015

(54) ABNORMALITY DETECTION APPARATUS FOR BRAKING FORCE DETECTOR

(75) Inventor: Yoshihisa Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/398,861

(22) PCT Filed: Jun. 7, 2012

(86) PCT No.: PCT/JP2012/003736
§ 371 (c)(1),
(2), (4) Date: Nov. 4, 2014

(87) PCT Pub. No.: WO2013/183089
PCT Pub. Date: Dec. 12, 2013

(65) Prior Publication Data
US 2015/0120162 A1    Apr. 30, 2015

(51) Int. Cl.
*B60T 17/22* (2006.01)
*B60T 8/88* (2006.01)

(52) U.S. Cl.
CPC ............... *B60T 17/221* (2013.01); *B60T 8/885* (2013.01); *B60T 2270/406* (2013.01)

(58) Field of Classification Search
CPC .. B60T 17/221; B60T 8/885; B60T 2270/406
USPC ............................................................ 701/70
See application file for complete search history.

(56) References Cited

U.S. PATENT DOCUMENTS

| | | | |
|---|---|---|---|
| 7,603,247 B2 * | 10/2009 | Isono et al. | 702/116 |
| 2007/0073494 A1 * | 3/2007 | Isono et al. | 702/41 |

FOREIGN PATENT DOCUMENTS

| | | |
|---|---|---|
| JP | A 2003-160046 | 6/2003 |
| JP | A 2006-213173 | 8/2006 |
| JP | A-2008-254521 | 10/2008 |

* cited by examiner

*Primary Examiner* — Mary Cheung
*Assistant Examiner* — Anne Mazzara
(74) *Attorney, Agent, or Firm* — Oliff PLC

(57) ABSTRACT

A braking force detector detects the braking force of a vehicle or a value based on which the braking force can be calculated. A steering torque sensor detects a steering torque of a steering wheel. A lateral acceleration sensor detects a lateral acceleration of the vehicle. A turning/braking judgment unit judges whether or not the vehicle is braking while turning. When the vehicle has been judged to be braking while turning, an abnormality judgment unit judges based on the steering torque and the lateral acceleration whether or not an abnormality has occurred in the braking force detector.

6 Claims, 2 Drawing Sheets

ABNORMALITY DETECTION APPARATUS FOR BRAKING FORCE DETECTOR

TECHNICAL FIELD

The present invention relates to a technique for detecting an abnormality that can occur in a braking force detector.

BACKGROUND ART

Conventional brake-by-wire systems such as an ECB (Electronically Controlled Brake) system are known in which the target deceleration is calculated based on the stroke value of depression of a brake pedal detected by a brake pedal sensor and the master cylinder pressure detected by a master hydraulic pressure sensor. Thus, if an abnormality (e.g., a gain abnormality) occurs in the master hydraulic pressure sensor, the hydraulic brake system is required to detect such an abnormality in an early stage.

For example, Patent document 1 discloses an apparatus comprising an estimation unit that estimates a first vehicle deceleration based on a brake hydraulic pressure detection value detected by a brake hydraulic pressure detection apparatus, and a detector that detects a second vehicle deceleration which is the actual vehicle deceleration, wherein judgment of whether or not an abnormality has occurred in the brake hydraulic pressure detection value is made based on the difference between the first vehicle deceleration and the second vehicle deceleration.

RELATED ART DOCUMENTS

Patent Documents

[Patent Document 1]
Japanese Patent Application Laid Open No. 2003-160046

DISCLOSURE OF THE INVENTION

Problem to be Solved by the Invention

Such a technique described in Patent document 1 requires, as an indispensable unit, a detector that detects the deceleration of the vehicle in order to judge whether or not an abnormality has occurred in the brake hydraulic pressure detection apparatus. This can lead to increased costs.

The present invention has been made in view of such a situation. Accordingly, it is a general purpose of the present invention to provide a technique for detecting an abnormality that can occur in a braking force detector such as a master hydraulic pressure sensor or the like without involving a deceleration detector such as a longitudinal acceleration sensor or the like.

Means to Solve the Problem

An embodiment of the present invention relates to an abnormality detection apparatus for a braking force detector. The abnormality detection apparatus comprises: a braking force detector that detects a braking force applied to a vehicle, or otherwise a value based on which the braking force can be calculated; a steering torque detector that detects a steering torque of a steering wheel; a lateral acceleration detector that detects a lateral acceleration of a body of the vehicle; a turning/braking judgment unit that detects whether or not the vehicle is braking while turning; and an abnormality judgment unit that judges whether or not an abnormality has occurred in the braking force detector, based on the steering torque and the lateral acceleration when the vehicle has been judged to be braking while turning.

Such an embodiment is capable of detecting an abnormality of the braking force detector using a steering torque detector which is an indispensable component provided to a vehicle employing an electric power steering apparatus It should be noted that the "braking force detector" includes a sensor that detects a physical value that relates to the braking force of the vehicle. Examples of such a "braking force detector" include a master hydraulic pressure sensor, a wheel cylinder hydraulic pressure sensor, and a brake pedal stroke sensor.

Advantage of the Present Invention

With the present invention, an abnormality of a braking force detector such as a master hydraulic pressure sensor can be detected without using a deceleration detector such as a longitudinal acceleration sensor.

BEST MODE FOR CARRYING OUT THE INVENTION

Figure 1:
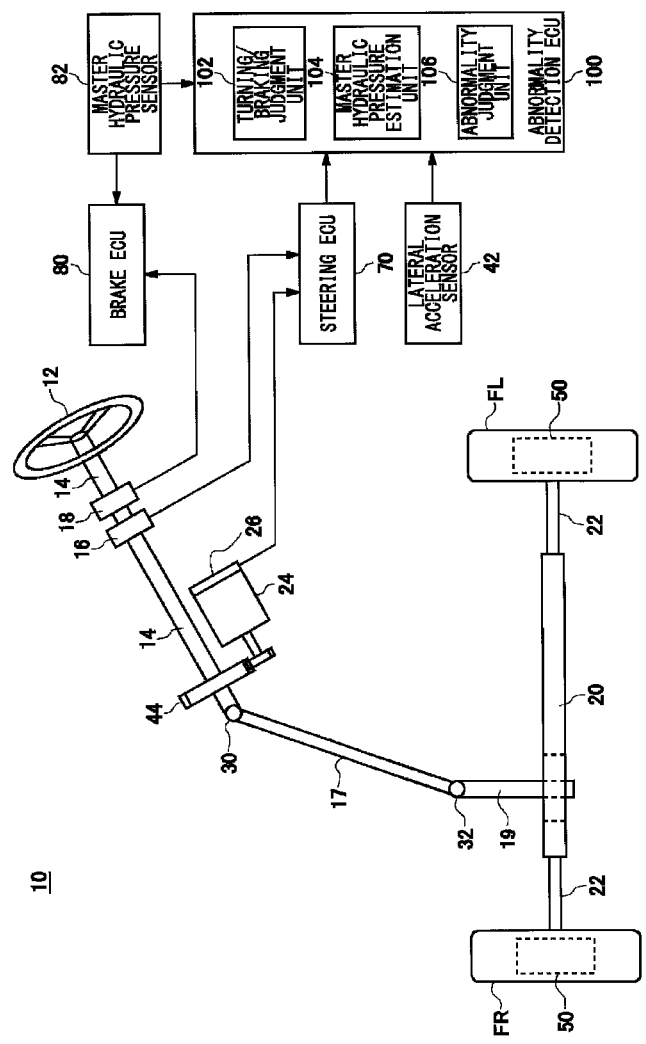
FIG. 1 is a diagram showing a schematic configuration of a vehicle including an abnormality detection apparatus for a brake hydraulic pressure sensor according to an embodiment of the present invention.

FIG. 1 shows a schematic configuration of a vehicle 10 including an abnormality detection apparatus for a brake hydraulic pressure sensor according to an embodiment of the present invention. FIG. 1 is a schematic diagram showing a front-wheel portion of a four-wheeled vehicle. By steering the right front wheel FR and the left front wheel FL each configured as a wheel for steering, such an arrangement allows the direction of travel of the vehicle to be changed.

The vehicle 10 includes an electric power steering apparatus (EPS). The EPS includes a steering wheel 12 for steering by a driver, a steering shaft 14 coupled with the steering wheel, a deceleration mechanism 44 arranged at the lower end of the steering shaft, and a steering assist motor 24 having an output shaft connected to the deceleration mechanism 44. The steering assist motor 24 rotationally drives the steering shaft 14 so as to generate an assist force in order to assist the steering operation.

The steering shaft 14 includes an unshown torsion bar, a steering torque sensor 16 that detects a torque that occurs at the torsion bar, and a steering angle sensor 18 that detects the steering angle of the steering wheel 12. The output of the steering torque sensor 16 is transmitted to a steering electronic control unit (which will be referred to as "steering ECU" hereafter) 70.

The steering shaft 14 is coupled with an intermediate shaft 17 and a pinion shaft 19 via universal joints 30 and 32. The pinion shaft 19 is coupled with a rack-and-pinion mechanism 20 arranged such that it extends along the lateral direction of the vehicle (vehicle width direction) and including a rack bar 22 that is slidable along the shaft longitudinal direction. The intermediate shaft 17 includes, as one of its components, a rubber coupling.

The rack-and-pinion mechanism 20 has a configuration in which pinion teeth formed at one end of the pinion shaft 19 are meshed with a rack shaft. The rack-and-pinion mechanism 20 is supported by the body of the vehicle via a steering gear mount bush 23.

When the driver operates the steering wheel 12, the rotation of the steering shaft 14 is transmitted to the rack-and-pinion mechanism 20 via the shafts 17 and 19. The rotation thus transmitted is converted by means of the rack-and-pinion mechanism 20 into linear movement of the rack bar 22 in the lateral direction. Both ends of the rack bar 22 are respectively connected to one end of a tie rod (not shown). The other end of each tie rod is coupled with a steering knuckle arm (not shown) that supports the corresponding front wheel, i.e., the right front wheel FR and the left front wheel FL. Such an arrangement allows the right front wheel FR and the left front wheel FL to be steered according to the linear movement of the rack bar 22.

The vehicle body includes a lateral acceleration sensor 42 that detects the lateral direction acceleration.

The steering ECU 70 calculates the assist torque for the steering torque based on the assist current value. The steering ECU 70 outputs a control signal that corresponds to the assist torque thus calculated to the steering assist motor 24. Also, an assist torque sensor may be provided for detecting the assist torque.

Such a steering mechanism including the EPS as described above has a known configuration. Accordingly, further detailed description thereof will be omitted in the present specification.

A brake pedal (not shown) is connected to a master cylinder (not shown) that supplies a brake fluid, configured as an operating fluid, according to the driver's operation of depressing the brake pedal. A master hydraulic pressure sensor 82 provided to a brake hydraulic control pipe that extends from the master cylinder measures the hydraulic pressure of the master cylinder, and provides the measurement value to a brake ECU 80. The brake ECU 80 generates a braking force for the vehicle based on the master cylinder hydraulic pressure and the like.

An abnormality detection ECU 100 detects whether or not an abnormality has occurred in the master hydraulic pressure sensor 82, based on the detection value detected by the lateral acceleration sensor 42, the detection value detected by the master hydraulic pressure sensor 82, and the detection value detected by the steering torque sensor 16.

In FIG. 1, the abnormality detection ECU 100 is shown as a function block diagram. Such components shown in the drawings in the form of functional blocks can be realized by hardware components, e.g., electronic elements or electronic circuits, such as a CPU and memory included in a computer. Also, such components can be realized by software components such as a computer program. In the drawing, the abnormal detection ECU 100 is shown as function blocks realized by a combination of hardware components and software components. Also, various combinations of such hardware components and software components may be made so as to provide such function blocks, which can be clearly understood by those skilled in this art.

A turning/braking judgment unit 102 judges based on the detection values of the sensors whether or not the vehicle is braking while turning.

When the vehicle is braking while turning, a master hydraulic pressure estimation unit 104 estimates the master hydraulic pressure based on the steering torque and the assist torque that occur in the EPS and the lateral acceleration of the vehicle. The estimation is made based on the principle described below. First, there is a relation between the master hydraulic pressure and the braking force generated in the vehicle. Thus, the master hydraulic pressure can be estimated based on the load shift to the vehicle front wheel shaft that occurs when braking. Second, when the vehicle is turning, the assist torque when braking is greater than that when not braking. Thus, the load shift to the vehicle front wheel shaft when the vehicle is turning can be estimated based on the lateral acceleration and the assist torque when the vehicle is turning. Here, the assist torque is calculated by the steering ECU 70 based on the steering torque as described above. Thus, such an arrangement requires only the steering torque sensor 16 and the lateral acceleration sensor 42 to estimate the master hydraulic pressure.

An abnormality judgment unit 106 makes a comparison between the estimated master hydraulic pressure estimated by the master hydraulic pressure estimation unit 104 and the measurement value of the master hydraulic pressure detected by the master hydraulic pressure sensor 82. When the absolute value of the difference between them is equal to or greater than a predetermined threshold value, the abnormality judgment unit 106 judges that an abnormality has occurred in the master hydraulic pressure sensor 82.

Description will be made below regarding the operation of the master hydraulic pressure estimation unit 104. The following Expressions will be represented using the following symbols.

$G_y$: Lateral acceleration of the vehicle
$G_x$: Longitudinal acceleration of the vehicle
WF: Load applied to the front wheel shaft of the vehicle
WR: Load applied to the rear wheel shaft of the vehicle
MT: Steering torque
MA: Assist torque
SAT: Reference value of self aligning torque
$\Delta SAT_y$: Change in the self aligning torque from the reference value due to the lateral acceleration
$\Delta SAT_x$: Change in the self aligning torque from the reference value due to the longitudinal acceleration
PMC: Estimated master hydraulic pressure value a through
g: Proportional coefficients The proportional coefficients a through g are employed in order to represent the expressions in a simple manner. In practical use, the proportional coefficients may be determined based on actually measured values for the vehicle. Also, the proportional coefficients may be obtained by simulation.

There is a relation described below between the lateral acceleration and the self aligning torque when the vehicle is turning.

$$\Delta SAT_y = a \cdot G_y \cdot WF \quad (1)$$

Furthermore, there is a relation described below between the lateral acceleration and the self aligning torque when the vehicle is braking.

$$\Delta SAT_x = b \cdot G_x \cdot (WF + WR) \quad (2)$$

When the vehicle is braking while turning, the shaft load $F_{str}$ applied to the tie rod of the steering system can be calculated using the following Expression.

$$F_{str} = c \cdot \Delta SAT_y + d \cdot \Delta SAT_x + e \cdot SAT \quad (3)$$

In Expression (3), the first term corresponds to the load due to turning, and the second term corresponds to the load due to braking.

By substituting Expressions (1) and (2) into the following Expression (3), the following Expression is obtained.

$$F_{str} = c \cdot a G_y \cdot WF + d \cdot b \cdot G_x \cdot (WF + WR) + e \cdot SAT \quad (4)$$

There is a relation between the steering torque applied according to the steering of the steering wheel and the shaft load applied to the tie rod as represented by the following Expression.

$$F_{str} = f(MT+MA) \quad (5)$$

The following relation is obtained using Expressions (4) and (5).

$$f(MT+MA) = c \cdot a \cdot G_y \cdot WF + d \cdot b \cdot G_x \cdot (WF+WR) + e \cdot SAT \quad (6)$$

By transforming Expression (6) for $G_x$, the following Expression is obtained.

$$G_x = \{f(MT+MA) - c \cdot a \cdot G_y \cdot WF - e \cdot SAT\} / \{d \cdot b \cdot (WF+WR)\} \quad (7)$$

On the other hand, there is a relation between the longitudinal acceleration $G_x$ of the vehicle body and the master hydraulic pressure PMC as represented by the following Expression. This relation is that, as the vehicle load becomes greater, the longitudinal acceleration becomes smaller, and that, as the master pressure becomes greater, the longitudinal acceleration becomes smaller.

$$G_x = g \cdot PMC / (WF+WR) \quad (8)$$

By transforming Expression (8) for PMC, the following Expression is obtained.

$$PMC = G_x \cdot (WF+WR)/g \quad (9)$$

By substituting Expression (7) into Expression (9), the following Expression is obtained.

$$PMC = \{f(MT+MA) - c \cdot a \cdot G_y \cdot WF - e \cdot SAT\} / (b \cdot d \cdot g) \quad (10)$$

Thus, the estimated value of the master hydraulic pressure can be obtained using Expression (10). It should be noted that, in a case in which SAT is approximately equal to zero, Expression (10) represents that the master hydraulic pressure is proportional to the difference between the assist torque applied by the EPS when the vehicle is braking while turning and the assist torque applied by the EPS when the vehicle is turning when not braking, i.e., the assist torque applied according to the braking when the vehicle is turning.

Figure 2:
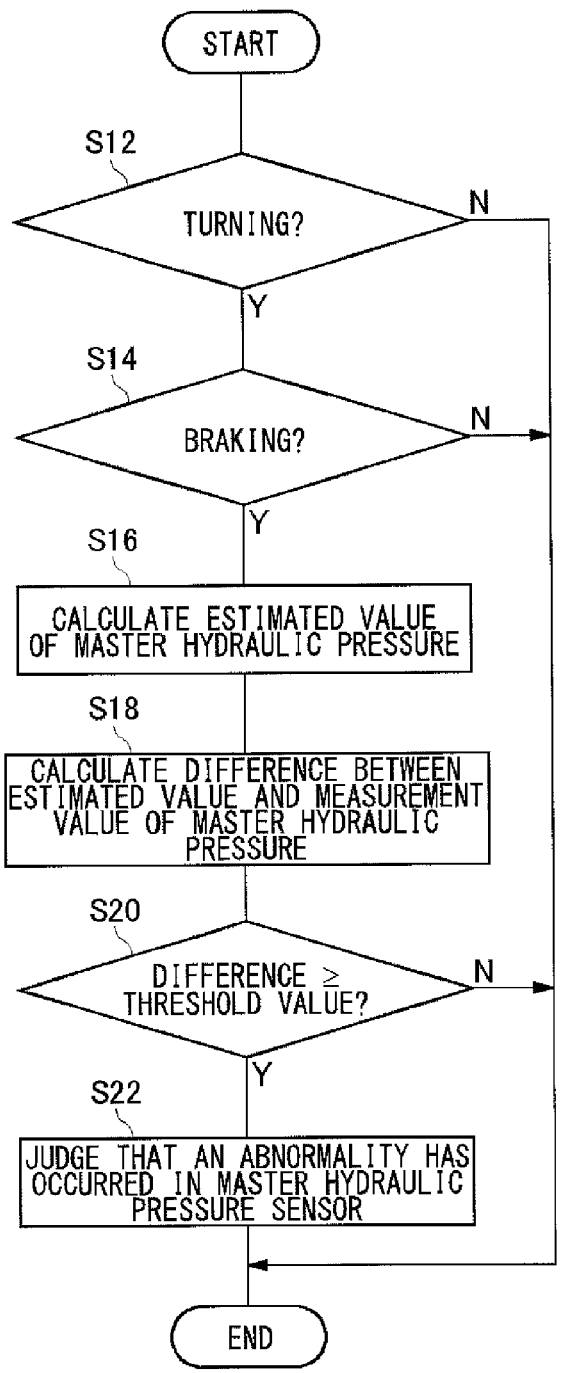
FIG. 2 is a flowchart for describing the operation of an abnormality detection ECU.

FIG. 2 is a flowchart for describing the operation of the abnormality detection ECU 100. First, the turning/braking judgment unit 102 judges whether or not the vehicle is turning (S12), and whether or not the vehicle is braking (S14). When the vehicle is braking while turning, the master hydraulic pressure estimation unit 104 calculates the estimated value of the master hydraulic pressure based on Expression (10) (S16). The abnormality judgment unit 106 calculates the difference between the measurement value of the master hydraulic pressure detected by the master hydraulic pressure sensor 82 and the estimated value of the master hydraulic pressure calculated in S16 (S18). When the absolute value of the difference thus calculated is equal to or greater than a predetermined threshold value (YES in S20), the abnormality judgment unit 106 judges that an abnormality has occurred in the master hydraulic pressure sensor (S20).

As described above, with the present embodiment, the estimated value of the master hydraulic pressure is calculated based on the detection value detected by the steering torque sensor of the EPS and the detection value detected by the lateral acceleration sensor. Furthermore, judgment is made whether or not an abnormality has occurred in the master hydraulic pressure sensor based on the comparison between the estimated value thus calculated and the measurement value of the master hydraulic pressure obtained by the master hydraulic pressure sensor. Thus, although the detection timing is limited to a timing when the vehicle is braking while turning, such an arrangement is capable of detecting whether or not an abnormality has occurred in the master hydraulic pressure sensor using a steering torque sensor which is an indispensable component provided to a vehicle employing an EPS.

The abnormality detection ECU 100 according to the present embodiment may be employed together with a longitudinal acceleration sensor that detects the longitudinal acceleration of the vehicle. As described above, there is a relation between the master hydraulic pressure and the braking force applied to the vehicle. Thus, the master hydraulic pressure can also be estimated based on the longitudinal acceleration applied to the vehicle when braking. Thus, in a case in which the vehicle includes a longitudinal acceleration sensor, a system can be configured to detect whether or not an abnormality has occurred in the master hydraulic pressure sensor, based on a comparison between the estimated value of the master hydraulic pressure and its measurement value. The abnormality detection ECU can be employed as a backup system that detects whether or not an abnormality has occurred in the master hydraulic pressure sensor if an abnormality has occurred in the longitudinal acceleration sensor or if an abnormality has occurred in a system including the longitudinal acceleration sensor.

Description has been made in the aforementioned embodiments regarding the present invention with reference to an example that detects an abnormality of the master hydraulic pressure sensor. However, with the present invention, an arrangement may be made which detects an abnormality of a desired sensor that detects a physical value that relates to the braking force applied to the vehicle. Examples of such a sensor include: a wheel cylinder hydraulic pressure sensor that detects the hydraulic pressure that occurs in a wheel cylinder 50 provided for each wheel; and a brake pedal stroke sensor that detects the stroke value of the depression of a brake pedal.

Description has been made above regarding the present invention with reference to the embodiments. Such embodiments have been described for exemplary purposes only. Also, it can be clearly understood by those skilled in this art that various kinds of modifications may be made by making a desired combination of the aforementioned embodiments, or otherwise a desired combination of components or processes described in the aforementioned embodiments, which are also encompassed within the technical scope of the present invention.

The present invention is not restricted to the above-described embodiments. Also, various kinds of design modifications may be made based upon the knowledge of those skilled in this art. The configurations in the drawings are shown for exemplary purposes only. Also, various modifications may be made so long as they provide the same functions.

Description has been made in the embodiments regarding an arrangement in which the abnormality detection ECU 100 is provided as an additional component that differs from the steering ECU 70 or otherwise the brake ECU 80. Also, the steering ECU 70 or otherwise the brake ECU 80 may be configured to perform detection of an abnormality of the braking force detector.

DESCRIPTION OF THE REFERENCE NUMERALS 10 vehicle, 16 steering torque sensor, 82 master hydraulic pressure sensor, 100 abnormality detection ECU, 102 turning/braking judgment unit, 104 master hydraulic pressure estimation unit, 106 abnormality judgment unit.

The invention claimed is:

1. An abnormality detection apparatus for a braking force detector, comprising:
   a braking force detector that detects a braking force applied to a vehicle, or otherwise a value based on which the braking force can be calculated;
   a steering torque detector that detects a steering torque of a steering wheel;
   a lateral acceleration detector that detects a lateral acceleration of a body of the vehicle;
   a turning/braking judgment unit that detects whether or not the vehicle is braking while turning; and
   an abnormality judgment unit that judges whether or not an abnormality has occurred in the braking force detector, based on the steering torque and the lateral acceleration when the vehicle has been judged to be braking while turning.

2. The abnormality detection apparatus according to claim 1, wherein the braking force detector is configured as a brake hydraulic pressure sensor.

3. The abnormality detection apparatus according to claim 2, wherein the abnormality judgment unit calculates an estimated value of a brake hydraulic pressure based on the steering torque and the lateral acceleration,
   and wherein, when the difference between a detection value detected by the brake hydraulic pressure sensor and the estimated value thus calculated is equal to or greater than a predetermined value, the abnormality judgment unit judges that an abnormality has occurred in the brake hydraulic pressure sensor.

4. The abnormality detection apparatus according to claim 3, further comprising:
   a longitudinal acceleration sensor; and
   a second abnormality judgment unit that judges whether or not an abnormality has occurred in the longitudinal acceleration sensor,
   wherein, when judgment has been made that an abnormality has occurred in the longitudinal acceleration sensor, the abnormality judgment unit judges whether or not an abnormality has occurred in the braking force detector.

5. The abnormality detection apparatus according to claim 2, further comprising:
   a longitudinal acceleration sensor; and
   a second abnormality judgment unit that judges whether or not an abnormality has occurred in the longitudinal acceleration sensor,
   wherein, when judgment has been made that an abnormality has occurred in the longitudinal acceleration sensor, the abnormality judgment unit judges whether or not an abnormality has occurred in the braking force detector.

6. The abnormality detection apparatus according to claim 1, further comprising:
   a longitudinal acceleration sensor; and
   a second abnormality judgment unit that judges whether or not an abnormality has occurred in the longitudinal acceleration sensor,
   wherein, when judgment has been made that an abnormality has occurred in the longitudinal acceleration sensor, the abnormality judgment unit judges whether or not an abnormality has occurred in the braking force detector.

* * * * *